July 15, 1947.  A. RICKENMANN  2,424,191
MACHINE FOR GRINDING TOOTHED GEARS
Filed Aug. 24, 1945  8 Sheets-Sheet 1

Inventor
Alfred Rickenmann
by Singer, Ehlert, Stern & Carlberg
Attorneys

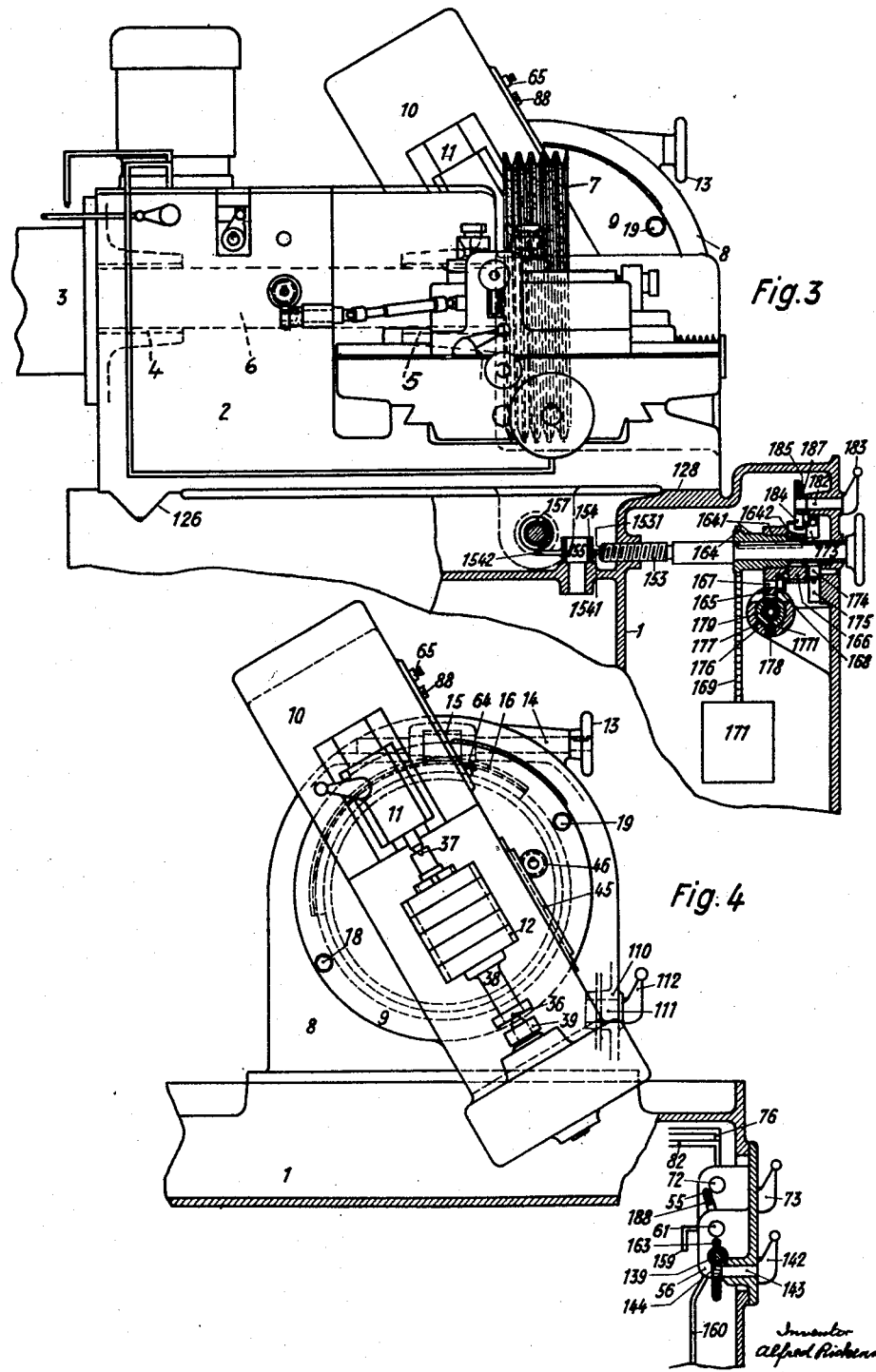

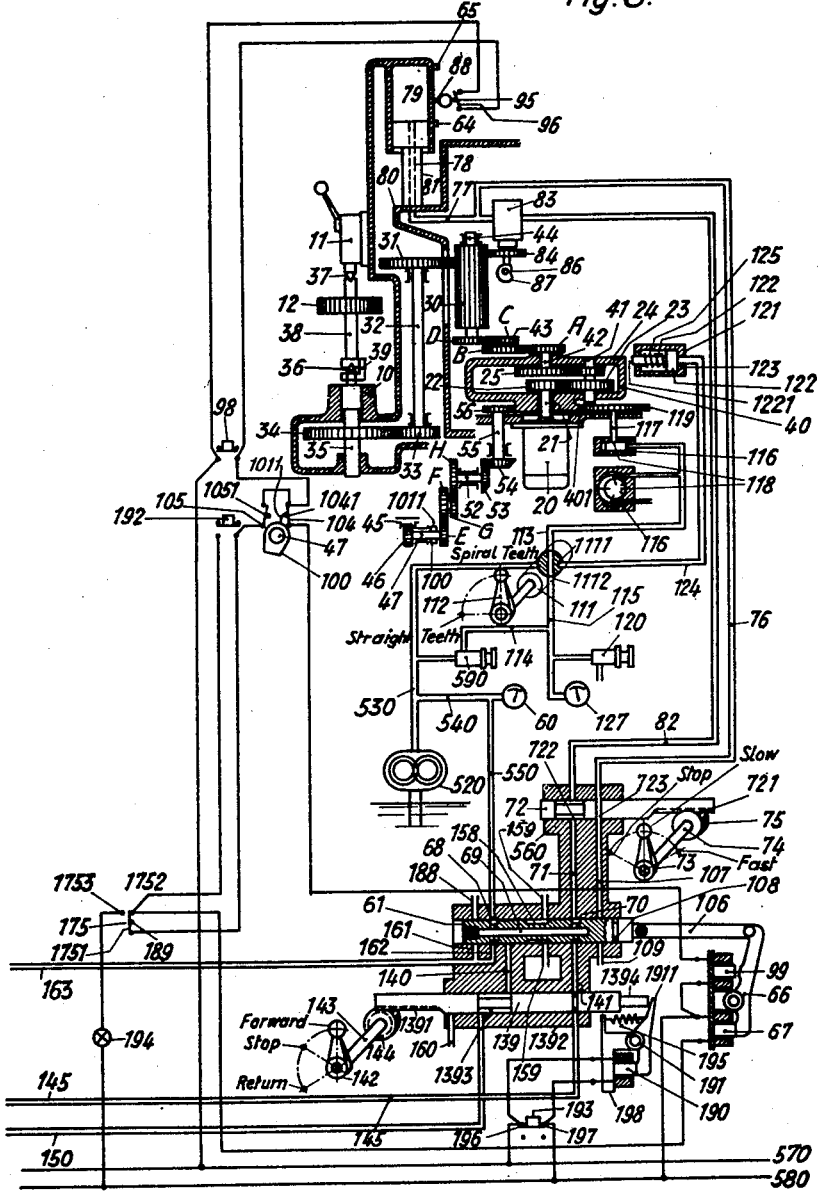

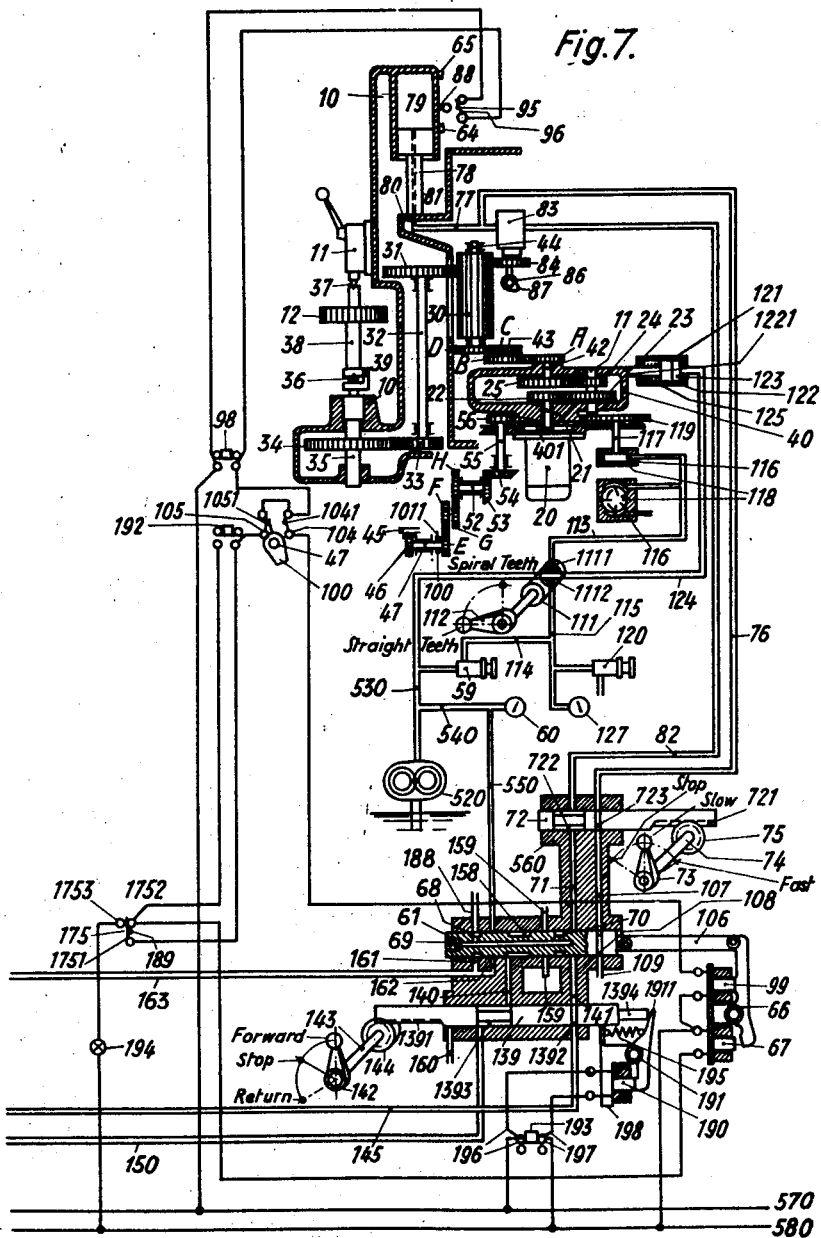

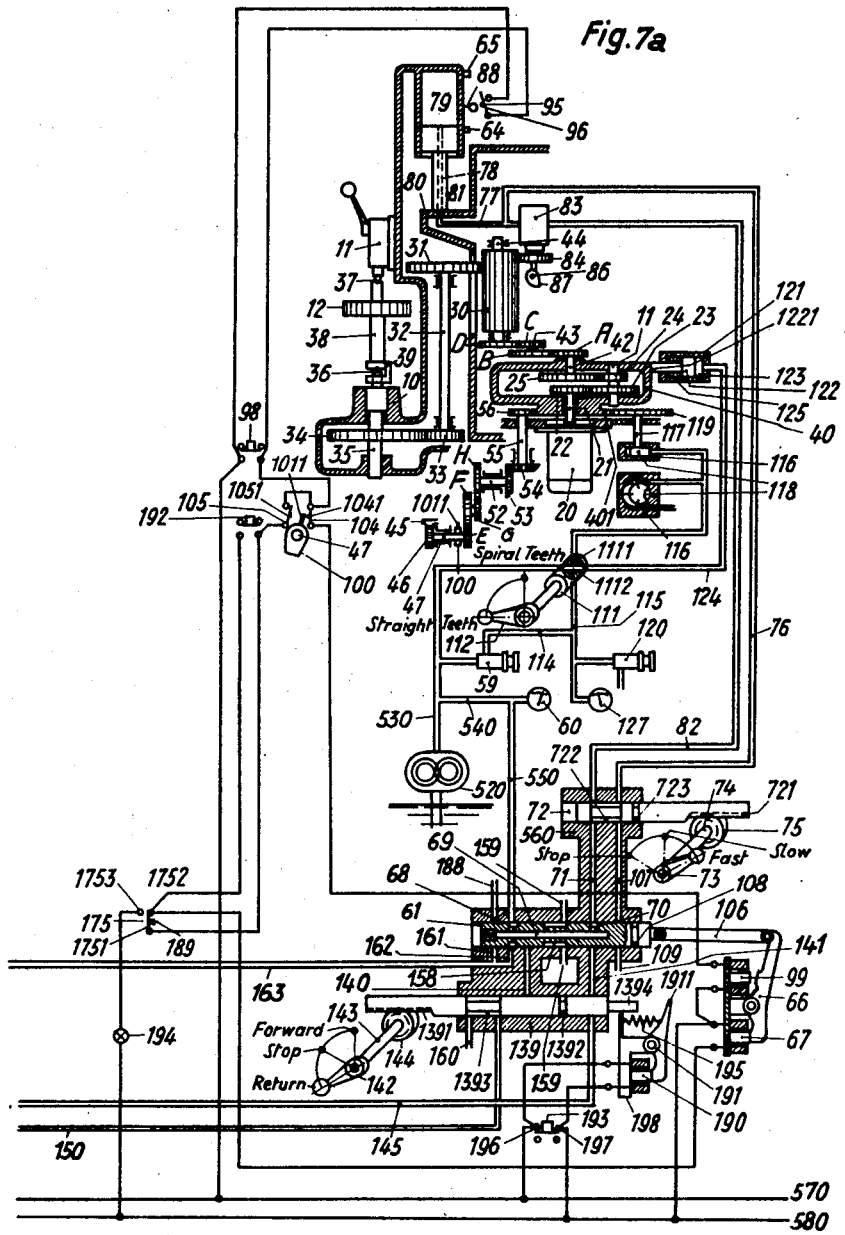

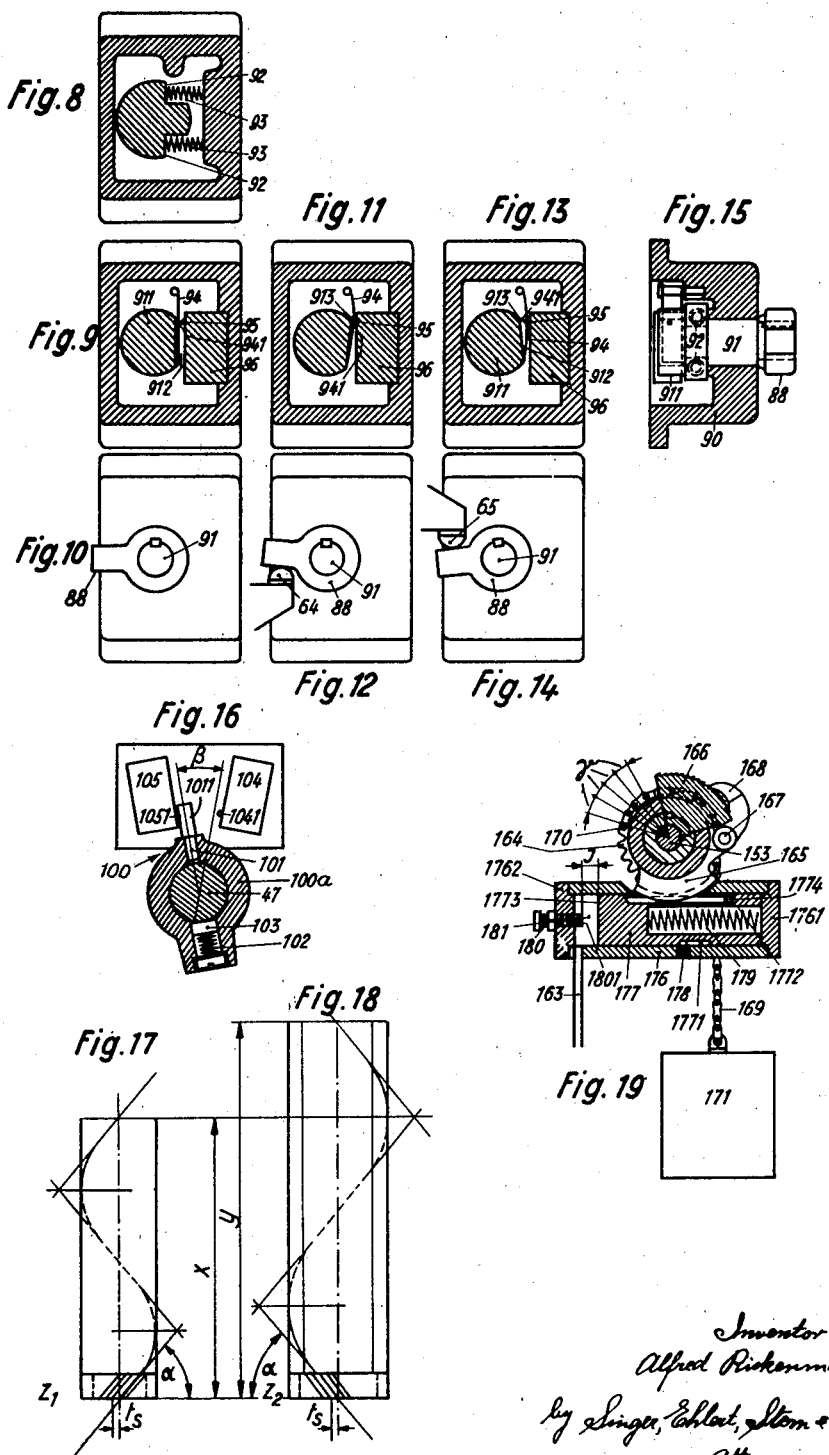

Patented July 15, 1947

2,424,191

UNITED STATES PATENT OFFICE 2,424,191

MACHINE FOR GRINDING TOOTHED GEARS

Alfred Rickenmann, Kusnacht, Zurich,
Switzerland

Application August 24, 1945, Serial No. 612,341
In Switzerland March 10, 1945

12 Claims. (Cl. 51—71)

1

The present invention relates to a new and improved machine for grinding the teeth of spur gears and of spiral gears by means of a grinding hob. The invention more especially relates to machines of the said type having a separate electric synchronous motor for driving the grinding hob and one for the shaft carrying the gear, the teeth of which are to be shaped.

It is to be understood, however, that the present disclosure is by way of illustration and it is not restrictive of the invention, it being obvious that the invention is susceptible of various modifications and embodiments, certain novel features may be employed in other relations than herein disclosed and the terms here used are merely terms of description and not terms of limitation.

The general aim of the invention is to provide an improved machine by means of which spur wheels or spirally toothed gears may be ground expeditiously and economically and with the greatest precision.

More particularly, the aim of the invention is to provide an improved machine by means of which the said toothed gears may be ground with extreme accuracy and at a high rate of production.

A further aim of the invention is to provide an improved machine having various features of novelty and advantage and which is characterized by its relative simplicity, by the smoothness and lack of vibrations or other disturbing factors with which the various movements are brought about, by the facility with which the machine may be set up; and the manner in which it is controlled to bring about the various movements in the proper sequence and relation.

Other objects will be in part obvious and in part pointed out more in detail hereinafter.

The invention accordingly consists in the features of construction, combination of elements and arrangements of parts which will be exemplified in the construction hereinafter set forth.

In the accompanying drawings an embodiment of the invention is shown by way of an example in a diagrammatical manner:

Fig. 3 is a side elevation, the automatic in-feeding device for the grinding tool carriage being shown in section.

Fig. 4 is a section taken on line A—A of Fig. 1, the workpiece carriage being shown in its inoperative position.

Figs. 6, 7 and 7a show each diagrammatically

Figure 1:
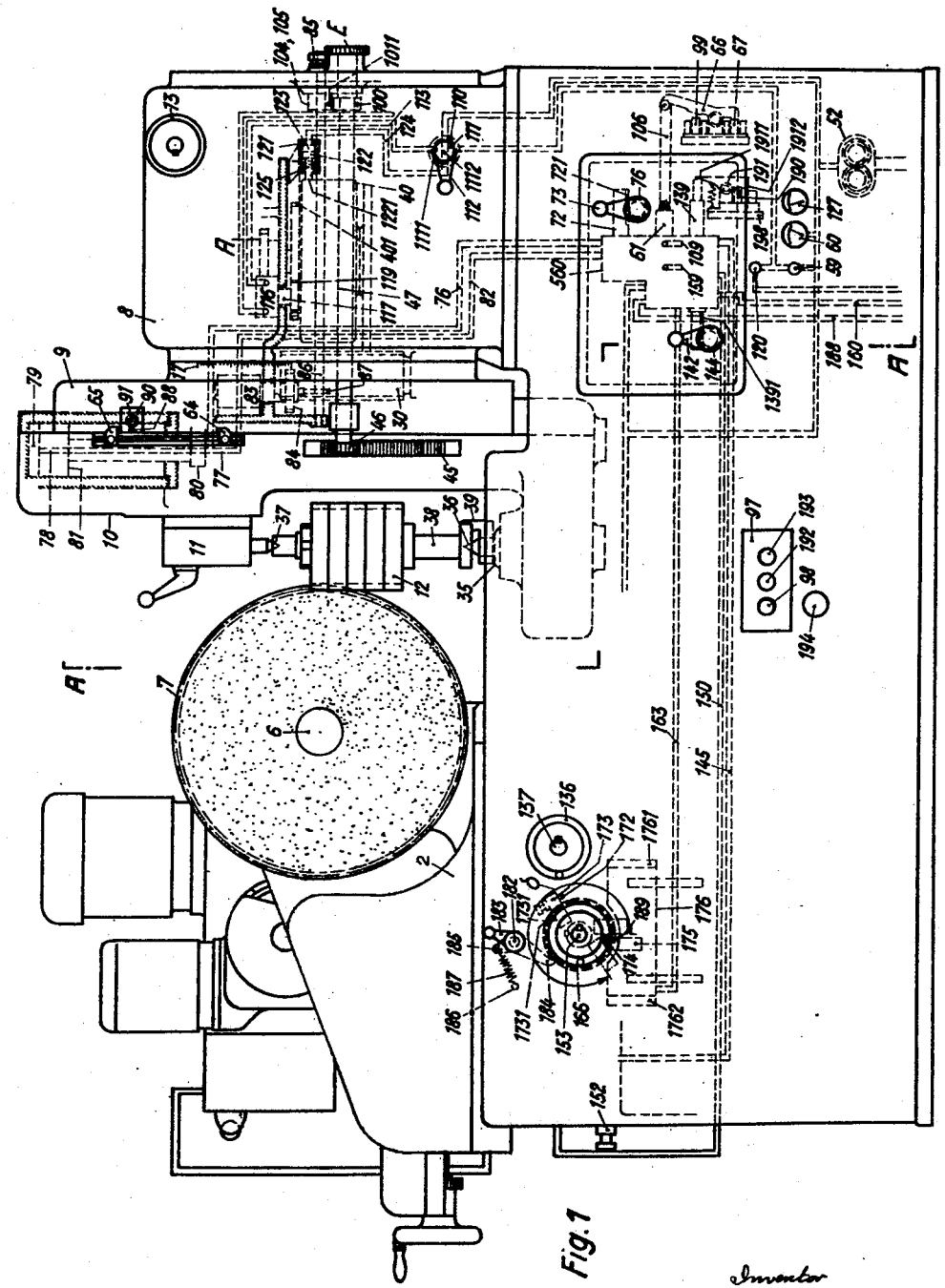
Fig. 1 is a side elevation of the machine.

2 the hydraulically and electrically controlled devices for reversing the movement of the workpiece carriage.

Figs. 8, 9 and 10 show the position of members controlled by the workpiece carriage while the carriage is moving.

Figs. 11 and 12 show the position of the same member during the reversing at the upper end position of the carriage.

Figs. 13 and 14 show the positions of said members during the reversal of the carriage at its lower end.

Fig. 15 is a longitudinal section of the controlling device.

Fig. 16 illustrates a detail of the reversing device for the workpiece-carriage.

Figs. 17 and 18 show the developed faces of two different spirally toothed gears.

Fig. 19 is a cross-section through the automatic working in-feed mechanism for the grinding wheel carriage.

This machine in general comprises means for supporting a toothed wheel, means for supporting and driving a grinding wheel in operative relation to the toothed gear, means for effecting a traverse movement axially of the toothed wheel and the grinding wheel, means to rotate said toothed wheel while traversing the grinding disk, and means for effecting a relative movement between the toothed wheel and the grinding wheel. The machine is also provided with a truing device for the operative face of the grinding disk and means for actuating the truing device in such a manner that the contour of the working faces of the ridge on the grinding wheel is maintained correct and so that the teeth of a spur wheel or a spirally toothed wheel may be ground to correct finished size.

On the base 1 of the machine a slide 2 (Figs. 1, 2, 3) is mounted to be movable in a horizontal guide way and carrying an electric synchronous motor 3 (Fig. 3). The armature shaft of the motor 3 is clutched to the shaft 6 of an abrasive grinding wheel 7, said shaft 6 running in bearings 4, 5. The cylindrical working face of the wheel 7 is profiled to grind the pre-profiled teeth of toothed gears.

Figure 2:
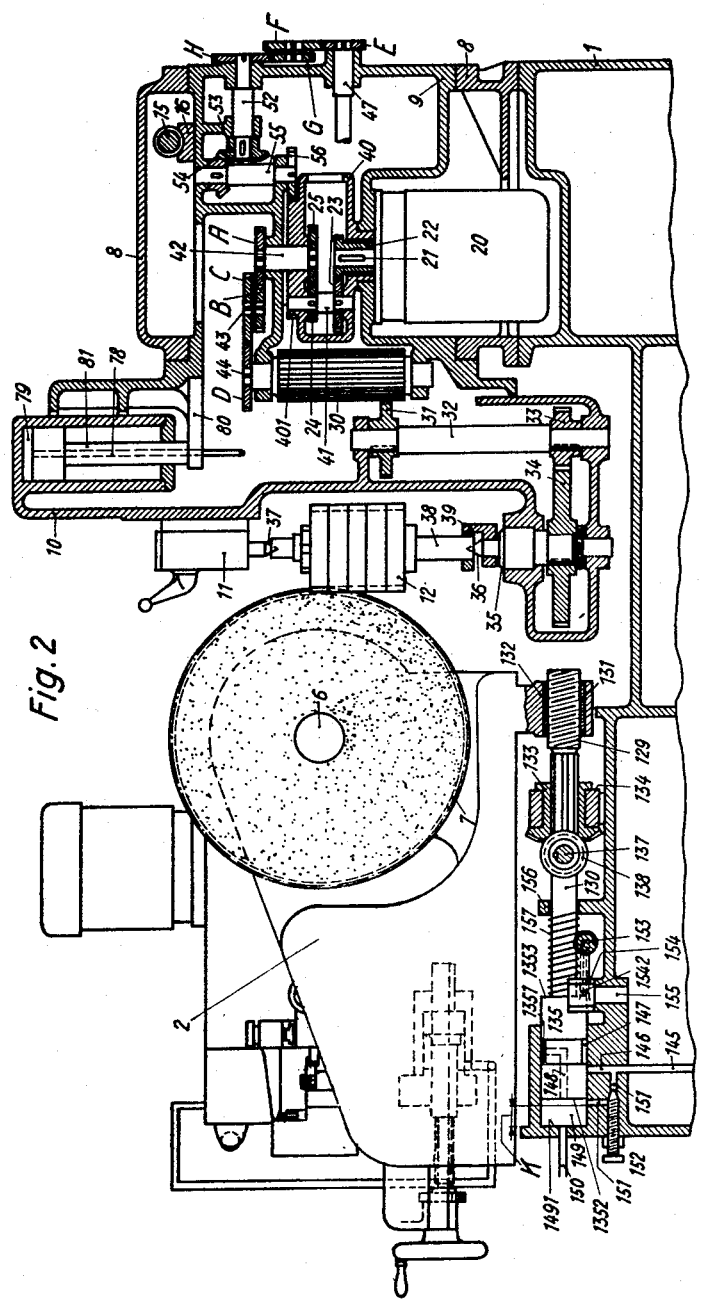
Fig. 2 is a longitudinal section through the workpiece-driving gear of the machine and through the means to feed the carriage, carrying the grinding tool.

On the base 1 a support 8 (Figs. 1 to 4) is fastened carrying a drum 9 (Figs. 2, 4). The drum 9 is rotatably mounted in said support 8 and is provided with means to assist the drive of the workpiece 12. A slide 10 running in guide ways on the front face of the drum 9 carries a headstock and a tail-stock 11 and therewith the workpiece 12.

To grind obliquely toothed gears means are provided to fasten the workpiece 12 at the proper angular position with reference to the grinding wheel 7. The drum 9 with the slide 10 for the workpiece thereon may be adjusted to the desired angular position by means of a hand wheel 13 (Figs. 3, 4) fixed to a shaft 14 operating a worm wheel and worm 15, 16. A scale 17 (Fig. 1) marked on the drum 9 facilitates the exact adjustment of the grinding wheel and the gear blank with reference to each other. By means of two screw bolts 18, 19 (Fig. 4) the drum 9 is adapted to be locked to the support 8 in the proper working position.

A special feature of the machine according to this invention consists therein that the least possible number of elements is arranged between the synchronous motor 20 (Fig. 2) and the shaft 32 employed for driving the workpiece 12. Moreover, only spur gears are used as transmission members between the motor and the workpiece driving spindle.

In machines of known construction worm gears in combination with bevel gears are commonly used for said purpose, but these known gears do not produce the same accuracy in grinding that can be attained with spur wheel gearings.

For this reason the motor 20 for driving the workpiece 12 and connected to the drum 9 drives by means of a shaft 21 (Fig. 2) the spur wheels 22, 23, 24, 25 and by the change speed gears A, B, C, D a long spur wheel 30. The rotations of the latter are transmitted to a gear 31 fixed to a shaft 32 and the latter drives by means of the spur wheels 33, 34, the working spindle 35. On a spindle 38 mounted between the centers 36, 37 one or several workpieces 12 are fastened. By a dog 39 the rotations of the spindle 35 are transmitted to the workpiece carrying spindle 38.

The change speed gears A, B, C, D are brought in operation according to the number Z of teeth of the workpiece 12. The casing 40 and the four spur wheels 22, 23, 24, 25 mounted therein form a differential gearing. For grinding spur gears with straight teeth, the casing 40 will be arrested during the grinding operation by means described later on. As the number of rotations of the workpiece 12 has to be lower than those of the shaft of motor 20, the said gears 22, 23, 24, 25 act also as a speed reduction gearing. The shafts 21, 41, 42, 43, 44, 32, 35 (Figs. 2, 5, 6, 7) journalled in the drum 9 and on the slide 10 are all parallel to each other. For the transmission of the rotations of the armature shaft of motor 20 to the work spindle 35, only spur wheels 22, 23, 24, 25, A, B, C, D, 30, 31, 33, 34 are used, because such gears may be produced with very high precision.

For grinding obliquely toothed gears the workpiece 12 has to be turned during the grinding operation. This may be effected in the following manner:

To the slide 10 carrying the workpiece 12 a rack 45 (Figs. 1, 4) is fastened, with which a pinion 46 is in engagement.

While the slide 10 is moving in its guide way the pinion 46 drives by means of the shaft 47 (Figs. 6, 7, 7a) and the four change speed gears E, F, G, H the shaft 52 and by a pair of bevel gears 53, 54 a shaft 55 and a spur wheel 56 a toothed rim 401 of the casing 40 of the differential gearing which casing is now caused to rotate. By rotating the casing 40, a differential drive of the workpiece 12 is attained.

The number Z of the teeth of the workpiece 12 to be ground will determine the use of either of the change speed gears A, B, C, D. The rate of transmission between the motor 20 and the workpiece 12 is determined by said gears. From this rate of transmission together with the desired pitch of the teeth to be ground the size of the four change speed gears E, F, G, H determining the differential motion are calculated.

A right hand pitched workpiece would have to receive an additional turning movement in the same direction in which the workpiece-shaft rotates. A left hand pitched workpiece would have to receive an additional movement in the opposite direction to the direction of rotation of the workpiece-shaft. Left hand screw gears are produced by inserting an additional change speed gear E, F, G or H in the differential gear train.

The transmission of the turns of the shaft of motor 20 onto the working spindle 35 is effected by the motor 20 which drives the differential gear-change speed gears 22—25. For grinding a spirally toothed workpiece having for instance a number of teeth equal to $Z_1$, a pitch angle $\alpha$, an angular pitch X and a circular pitch $ts$, the driving gear train would have to include the change speed gears $A_1$, $B_1$, $C_1$, $E_1$, $F_1$, G and H.

By the means described it is possible to adjust the machine for working on gears having different numbers of teeth $Z_2$, $Z_3$, $Z_4$, etc., but of the same angle $\alpha$ and of the same circular pitch as by simply changing the change speed gears A, B, C and D according to the number of teeth of the gear to be worked while the change speed gears E, F, G and H may remain in the train of gears.

Pairs of spirally toothed gears of the highest precision may be produced as the teeth are shaped always with the same differential train of gears E, F, G and H by which exactly the same lead angle $\alpha$ is produced.

In the Figures 17, 18 two spur wheels are shown having the same lead angle $\alpha$ and the same circular pitch $ts$. The spur wheel shown in Fig. 17 has $Z_1$ teeth and a lead of the spiral equal to X. The spur wheel in Fig. 18 has $Z_2$ teeth and a lead of the spiral equal to Y. From this follows:

The lead of the spiral changes by a given lead angle $\alpha$ in proportion to the number of teeth. The ratio $Z_1:Z_2$ may be given by the ratio of the two sets of change speed gears.

$$\frac{A1C1}{B1D1} \cdot \frac{A_2C_2}{B_2D_2}$$

This may be given as follows:

$$\frac{A_1C_1}{B_1D_1} \cdot \frac{A_2C_2}{B_2D_2} = X:Y$$

From this formulae follows: that with a set of gears $$\frac{A_2.C_2}{B_2.D_2}$$

for grinding the teeth of a wheel with a number of teeth equal to $Z_2$ a differential motion for a spiral lead Y may be obtained without replacing the train of gears E, F, G and H used for grinding a toothed gear with a number of teeth equal to $Z_1$ and a spiral lead X.

To feed the carriage 10 and to operate the different auxiliary controlling devices of the machine described hereinafter, fluid pressure operated devices and electrically controlled means are provided (Figs. 1, 6, 7, 7a). The fluid under pressure is delivered by a pump 520 which is connected by the pipes 530, 540 and 550 to the controlling device 560. By this device 560 the movements of the different controlling means are initiated. Electric current is supplied by the net 570, 580.

The pressure of the liquid is controlled by an automatic valve 590 and may be read off on a pressure gauge 60. The fluid passes through the pipe 550 to the main valve 61 and passes on to the different controlling valves 72, 139 as described hereinafter.

When working, the slide 10 is moved upwardly and the workpiece 12, while being rotated, is passed along the rotating grinding wheel 7. The latter will be drawn back from its working position while the slide 10 moves downwardly by means described hereinafter. The stroke of the slide 10 is limited by adjustably mounted stops 64, 65 (Figs. 6, 7, 7a).

While the slide 10 performs its upward stroke, the main valve 61 is in the position shown in Fig. 6. Liquid under pressure from pipe 550 enters the circular groove 68 and the bore 69 which communicates with an annular groove 70 connected with a passage 71 leading to the piston valve 72. To operate the piston of valve 72 a rack 721 is provided on the piston rod with which a gear 75 is in mesh. The gear 75 is keyed to a shaft 74 which may be rotatably adjusted by a hand lever 73 into three different positions (Figs. 6, 7, 7a).

In the position marked "Fast" (Fig. 7a) in which the lever 73 is directed to the right and upwardly, the device is prepared for work. The piston valve 72 has opened the passage for the liquid under pressure to flow through annular groove 722 into the tubes 76, 77 and into a bore 78 in the piston rod 81 and into the cylinder 79 arranged at the upper end of slide 10. The cylinder 79 moves upwardly together with the slide 10, while the latter performs its stroke, until lower end of the piston rod 81 abuts on the support 80 of drum 9. The influx of a great quantity of liquid under pressure produces a quick upward movement of the slide 10.

To make the machine ready for the grinding operations the lever 73 is brought into its vertical position denoted by "Slow" (Fig. 6). The valve 72 is set thereby to pass the pressure fluid from annular groove 722 and tube 82 to a pump 83 the fluid flowing through the passages 77, 78 into the cylinder 79.

The movement of the slide 10 is effected now by the pump 83 arranged between the conduits 77, 82.

The pump 83 is provided with means known per se to control the amount of liquid discharged. The pump 83 is driven by a spur wheel 84 engaging the long spur wheel 30. It is a special feature of this device that the drive of the pump 83 is made dependent on the ratio of transmission of the set of gears A, B, C and D. The feed for each full turn of the workpiece 12 may be seen from the position of the controlling device of pump 83.

By turning a knob 85 (Fig. 1) a cam 87 is adjusted by means of a shaft 86 rotatably mounted in the drum 9, the volume of pressure liquid is controlled thereby. The feed of the slide 10 for each full turn of the workpiece 12 may be adjusted within certain limits by said means.

By placing the lever 73 in its position denoted by "Stop" the slide 10 is stopped at any position of its stroke. The piston valve 72 closes the passages 76, 82 of the pressure liquid.

To change the direction of the travel of the slide 10 the following means are used:

Near the guide-way for the slide 10 a small casing 90 (Fig. 1) is arranged in which a shaft 91 (Fig. 15) is journalled on which a short lever 88 (Figs. 6, 7, 7a, 10, 12, 14, 15) is fastened. The shaft 91 is provided with two recesses 92 (Fig. 8) on which are acting two springs 93. The springs 93 are of equal force, they abut on the wall of the casing 90 and have the tendency to keep the lever 88 in its horizontal position.

On a flattened part at the end 911 (Figs. 9, 11, 13, 15) of the shaft 91 one end of a flexible band 94 is fastened the other end of which is attached to the wall of casing 90. The flexible band 94 runs parallel to the plane 912 of the end 911 of shaft 91 as long as lever 88 is in its horizontal position.

When the slide 10 moves upwardly, the dog 64 (Figs. 1, 12) comes to bear on the lever 88. The latter and with it the shaft 91 is rotated in the direction of the hand of the clock. The plane 912 assumes an oblique position and the edge 913 (Fig. 11) bends the band 94 sufficiently to press a contacting part 941 (Fig. 11) against the switch button 95 (Figs. 6, 7, 7a) of an impulse switch 96 of known construction. The reversing of the slide 10 is thereby initiated.

In a similar manner the lever 88 will be moved in the anticlock direction by the dog 65 (Fig. 14) when the slide 10 moves downwardly. The flexible band 94 will again be stressed and contact is made at 941 with the button 95.

To reverse the travel of the slide 10 at any point between the ends of its stroke and without making use of the switch 96 and the dogs 64, 65 a push button 98 (Figs. 1, 6, 7, 7a) is provided on the plate 97 mounted on the base 1.

The said means to reverse the travel of the slide 10 either by hand or automatically by the dogs 64, 65 comprise a device to direct the given electric impulses in proper sequence on to the controlling magnets 67, 99 (Figs. 1, 6, 7, 7a) in such a manner that the upstroke of slide 10 is a working stroke and the downstroke an idle stroke. To attain this, a switching device 100 (Figs. 6, 7, 7a, 16) is arranged, actuated by the shaft 47 and gear 46. The said shaft 47 is driven by the gears E, F, G, H and the gearing 52 to 56 from the casing 40 of the differential gearing.

In a sleeve 100a (Fig. 16) of said switching device, a contact pin 101 (Fig. 16) is arranged, and a radial spring 102 in said sleeve 100a urges a friction member 103 against the shaft 47. The portion 1011 of the contacting pin 101 projecting radially from the sleeve 100a is arranged between two circuit controlling devices 104, 105 arranged within the drum 9. The force of the spring 102 and the friction created by member 103 is sufficient to turn the sleeve 100a by the shaft 47 as long as the projecting end 1011 of the contacting pin 101 does not abut on either of two buttons 1041, 1051 of said devices 104, 105.

As diagrammatically shown in Figs. 6 and 7a, the contacting pin 1011 presses on the button 1041 of the switch 104 while the slide 10 moves upwardly. From the diagram in Figs. 6, 7, and 7a it will be seen that the next impulse—whether given manually by operating push button 98, or automatically by dog 64—will operate the reversing magnet 99 if a switch 175 is closed.

When the slide 10 changes the direction of its travel, there changes too the direction in which the shaft 47 is turned. At the start of the return stroke of the slide 10 the sleeve 100a of the switching device 100 will take part of the rotation of shaft 47 and will be moved by an angle β (Fig. 16) anti-clockwise. The switch 105 is opened when the switch 104 is closed by the pin 1011 and, the switch 105 when operated by the pin 1011 closes the circuit of the magnet 67 controlling the working stroke. At the first current impulse the working stroke will be started. While these switching operations are being performed the switch 175 is kept closed for a purpose explained later on.

When the reversing magnet 99 (Figs. 6, 7, 7a) destined to control the return stroke of slide 10 is energized, it will attract the double armed lever 66 and turn the same. At the same time the link 106 connected to lever 66 moves the piston of the main valve 61 to the left into the position shown in Fig. 6. The piston stops the flow of the liquid under pressure to the different controlling devices by closing the supply conduit 550.

By placing the lever 73 into the position "Slow" or "Fast" the slide 10 will move downwardly pressing the liquid into the collecting basin through the passages 78, 77, 76, the annular groove 723 or 722, the passage 107, the annular groove 108 and the draining pipe 109 into the collecting basin.

By placing the lever 75 into the position "Stop" the slide 10 will come to rest at its uppermost position. The piston 72 obstructs the outflow of the liquid from cylinder 79 and the conduits 76, 77, 78 and 82.

All the elements used for the drive of the workpiece 12, viz. 44, 30—35, 20—23, 41, 24, 25, 42, A, B, C and D are moving continuously in the same direction whether the slide 10 moves upwardly or downwardly.

The elements, however, which form part of the differential gearing, used for the grinding of obliquely toothed gears, viz. 45—47, E, F, G and H, 52—56, 40 change their direction of movement together with the slide 10.

By changing the direction of movement of the members of the driving train 45—47, E, F, G, H, 52—56, 40 the lost motion and the play may result in inaccuracies. By grinding gears with a high spiral pitch much time is lost during the reversal of the motion to take up all the play of the members of the train.

To obviate these drawbacks the following means are employed:

In a bore 110 (Fig. 1) of the support 8 a controlling piston 111 (Figs. 6, 7, 7a) is rotatably mounted. To the piston 111 a hand lever 112 is fastened by which the piston 111 may be set in either of two positions:

*"Spiral teeth" or "straight teeth"*

When the lever 112 and therefore the piston 111 is in the position "Spiral teeth" liquid under pressure passes from the pressure reducing valve 590 through the pipes 114, 115 (Fig. 6) piston valve 111, through pipe 113 into a rotary motor 116 of known construction. The casing of motor 116 is fastened to the drum 9. On a shaft 117 rotatably mounted in the drum 9, a rotor 118 and a spur wheel 119 are fastened. The spur wheel 119 is in mesh with a toothed rim 401 of the casing 40 of the differential gearing.

Owing to the eccentric position of the rotor 118 in the motor casing the liquid under pressure will produce a torque which will be transmitted from the shaft 117 to the spur wheel 119 and therefrom to the train of gears 40, 56 to 52, H, G, F, E, 47 and 46. By reversing the movements of the slide 10 the direction of rotation of the members of said train of gear will be reversed too. The torque is such that whatever the direction of the moving slide 10 is, the train of gear will move in the same direction. By reversing the motion of the slide 10, there will be therefore no dead play at all.

The ratio of transmission of the rack 45 and the toothed rim 401 corresponds to the spiral pitch of the workpiece and is determined by the gears E, F, G and H. It may vary within wide limits. By means of a pressure controlling valve 120 built into the pipe 115 and with the aid of a pressure gauge 127, the torque may be controlled in such a manner that the force acting on the rack 45 of the slide 10 can be adjusted to be approximately the same whatever the ratio of transmission E, F, G and H will be.

In the drum 9 a small casing 121 (Figs. 6, 7, 7a) is arranged having a bore 123 in which the piston 122 is slidably arranged. The bore 123 is connected by a pipe 124 with the controlling valve 111. When spirally toothed spur wheels are ground, a spring 125 presses the piston 122 to the right and forces the liquid in the bore 123 into a pipe 124 and through a passage 1111 in the piston of valve 111 back into the basin.

When the lever 112 is brought into the position "Straight teeth" the liquid under pressure passes from the pressure side 530 of the pump 520 (Figs. 7, 7a) through a passage 1112 of a valve and the pipe 124 into the cylinder 123. The piston 122 moves to the left until the outer end 1221 of its piston rod comes to bear on the casing. The latter is now arrested and any differential motion is prevented.

To operate the grinding carriage 2 (Fig. 1, 2, 3) movable in the guide ways 126, 128 of the base 1 the following means are employed:

The screw threaded portion 129 (Figs. 2, 5) of the feeding spindle 130 engages a nut 131 on the support 132 of the carriage 2. A part of said spindle 130 between the ends thereof is provided with splines and extends axially through a conical gear 133 rotatably mounted in an arm 134 of the base 1. The outer end 135 of the spindle 130 serves as a feeding piston and is slidably mounted in a cylinder integrally formed with the base 1.

By turning the hand wheel 136 (Fig. 1) a shaft 137 rotatably mounted in the base 1 is turned and therewith the bevel gears 138 and 133, of which the latter is slidably keyed to the splined portion of spindle 130. The rotations thereof are transmitted to the feed spindle 130 and by it to the grinding disk carriage 2.

The device to move the carriage 2 by hand is constructed in such a manner that the latter may be adjusted manually independently from the hydraulic feeding mechanism.

The adjusting of the carriage 2 over a greater distance, say for changing the workpiece or for measuring purposes, is more conveniently effected by the hydraulic feeding device as follows:

At the controlling unit 560 a piston valve 139 (Figs 1, 6, 7, 7a) is arranged which is connected by conduits 140, 141 with the main governing valve 61. To the piston of valve 139 a rack 1391 is attached. The piston of valve 139 may be axially adjusted to three different positions by means of a hand lever 142, fixed to a shaft 143 and carrying a spur wheel 144 meshing with the rack 1391.

When the lever 142 is in the position "Forward" and when the main valve 61 is in its operative position liquid under pressure passes through conduit 141, through the annular groove 1392, and into the pipe 145 and from there through the branch pipe 146 into the annular groove 147 of the piston 135, through bore 148 into the cylinder 149 and pipe 150 into the annular groove 1393 and conduit 140. The piston 135 and therewith the feed spindle 130 are moved to the right and the grinding disk on the carriage 2 is fed towards the workpiece 12.

As soon as the piston 135 has passed over a distance equal to K (Fig. 2) the edge 1351 thereof starts to close the inflow-opening 146 and therewith the influx of liquid into the annular groove 147 of piston 135. At the same time the edge 1352 (Figs. 2, 5) opens the narrow branch pipe 151 communicating with the pipe 146. By the small amount of liquid under pressure flowing through the pipe 151 into the cylinder 149, the latter is slowly filled and the carriage 2 is moved. The amount of liquid flowing into cylinder 149 and the speed of the feeding motion of carriage 2 may be controlled by means of a throttling valve 152 arranged in the pipe 151.

On the end face 1531 (Fig. 5) of a feeding spindle 153 arranged in the base 1 abuts the nose 1541 of a double armed lever 154 rotatably mounted on a pin 155 of the base 1. The other nose 1542 serves as an abutment for the face 1353 of the piston 135 and limits its feeding motion. When feeding the carriage 2 towards the workpiece 12, a spring 157 is tensioned, abutting on said front face 1353 and on the rib 156 of base 1.

During the reversal of the motion of the slide 10, at the upper end of its stroke that is in advance of the downward stroke of the slide 10, the grinding disk 7 will be automatically removed for a small distance from the workpiece 12. The slide 10 remains in this position until the governing device is again set to act for the next working period. This automatic withdrawing of the grinding disk 7 is effected as follows:

The flow of the liquid to the cylinder 149 is stopped at once as soon as the main controlling valve 61 (Figs. 6, 7, 7a) has assumed the left hand end position shown in Fig. 7, in which the return motion of the slide 10 is effected. In this position of the main valve 61 the annular groove 158 communicates with the passage 140. When the valve 61 assumes the right hand end position the said groove 158 communicates with the outflow pipe 159 (Fig. 6). In its left hand end position the said groove 158 is filled with liquid from passage 140, the liquid being forwarded from the cylinder 149 owing to the expansion of the spring 157 acting on the face 1353. The distance which the carriage 2 with the grinding disk 7 is automatically withdrawn from the workpiece 12 corresponds to the amount of pressure liquid which finds place in the annular groove 158.

By restarting the working stroke of the carriage 2 the liquid in the groove 158 is discharged through the pipe 159 (Fig. 6) into the basin. Liquid under pressure in the pipe 145 now feeds the carriage 2 towards the workpiece 12 until it abuts the nose 1542 of the lever 154. The said withdrawing- and infeed-movements are repeated at the beginning of each downward or upward stroke of the workpiece slide 10 as long as the main control valve 61 performs said movement too, and lever 142 remains in its "Forward" position.

In its middle position "Stop" of the lever 142, the piston of valve 139 closes the passages 140, 141 at any position of the main control valve 61. No liquid enters the pipes 145, 150 and the cylinder 149, nor leaves the said parts. The carriage 2 remains now in the position it had attained at the moment of bringing the lever 142 to the position "Stop."

When the lever 142 is brought to the position "Return" the piston of the valve 139 is in its left end position (Fig. 7a). The passage 141, through which at times liquid passes at times is closed thereby.

The annular groove 1393 connects the pipe 150 with the pipe 160 leading to the basin. The spring 157 acts on the piston 135 and the liquid in the cylinder 149 is forced into the pipe 150, the groove 1393 and into the pipe 160. The carriage 2 moves backwardly into the hind end position in which the face 1352 of piston 135 rests against the wall 1491 of the cylinder 149.

The machine is provided with an automatic feeding device, comprising the pipes 161, 162 and 163 which are connected to the main controlling valve 61.

In the base 1 a right handed screw threaded feeding spindle 153 (Fig. 5) is arranged, the front face 1531 of which serves as an abutment for the nose 1541 of the double armed lever 154. On the spindle 153 a sprocket gear 164 (Fig. 3) is keyed having a long hub 1641. On the middle part thereof a toothed segment 165 is mounted while at the end portion 1642 of the hub a ratchet gear 166 is fastened. The toothed segment 165 carries a pin 167 (Fig. 3) on which a pawl 168 is rockingly mounted, which pawl co-operates with the said ratchet gear 166. Only movements of the toothed segments 165 in counter-clock direction are transmitted to the ratchet wheel 166 and therewith to the spindle 153.

A chain 169 (Figs. 3, 19) passing over the sprocket gear 164 is fastened with one of its ends to a stud 170 on said gear and carries at its other end a weight 171 which tends to rotate the ratchet gear 166 in the direction of the clock hand. The gear 166 is provided with a steering ledge 173 (Figs. 1, 5) carrying a contact 172. A stop pin 174 and a switch 175 are arranged on the base 1 (Figs. 1, 3).

The automatic feeding motion is effected as follows:

In a cylinder 181 of a support 176 (Figs. 1, 3, 5, 19) fastened to the base 1 a piston 177 is slidably arranged. Into an axial groove 1771 (Figs. 3, 19) of the piston 177 projects a pin 178 fastened to the support 176. A spring 179 (Fig. 3) resting on the cover 1761 (Figs. 1, 19) and guided in a bore 1772 tends to press the piston 177 against the face 1801 of a set screw 180 in the cover 1762. The length of the stroke J of the piston 177 depends on the position of the set screw 180. The cylinder 181 is closed by the cover 1762 and the space between the cover 1762 and the piston face 1773 communicates with the main controlling valve 61 by the pipes 163, 162 and 161. Part of the mantle of the piston 177 forms a rack 1774 with which the toothed segment 165 is in mesh. If, after reversing at the end of a return stroke of the slide 10 the main controlling valve 61 has attained the right hand end position (Figs. 6, 7a) liquid under pressure passes through the annular groove 68 and the pipes 162, 163 into the cylinder 181 and moves the piston 177 to the right (Fig. 19) until the same comes to rest on the cover 1761 of the cylinder. The rack 1774 turns the toothed segment 165 and the sprocket gear 164 in anti-clockwise direction. The pawl 168 transmits the said rotary movement on to the ratchet wheel 166 and therewith on to the spindle 153. The latter performs a turning motion equal to the angle γ therewith, causing an axial displacement in the direction of the arrow (Fig. 5) according to the pitch of the screw threads on the spindle 153.

When lever 142 (Figs. 6, 7, 7a) is in the position "Forward" the carriage 2 is fed simultaneously by the moving of piston 61 until face 1353 strikes against the double armed lever 154. During the grinding operation, pressure is kept up in the cylinder 149 and the displacement of the spindle 153 is positively transferred to the carriage 2 as an additional feeding motion.

By shifting the ratchet wheel 166 (Fig. 19) the weight 177 is lifted accordingly. On a shaft 182 (Figs. 1, 3) rotatably mounted in the wall of the base 1, a hand lever 183 and a pawl 184 are fastened. A spring 187, fastened with one end in an eye 185 of the pawl 184 and with the other end to a stud 186 of the base 1, keeps the pawl 184 in engagement with the ratchet wheel 166. Any motion of said wheel 166 in clockwise direction occasioned by the weight 171 is thereby obviated.

When the main controlling valve 61 is brought into the "Return stroke" position the influx of liquid into cylinder 181 (Fig. 19) is interrupted. By the action of the spring 179 the liquid in said cylinder 181, in the pipes 163, 161 and in the annular groove 68 is driven through the outflow pipe 188 and the piston 177 is moved to the left until the latter is arrested by the face 1801. The toothed segment 165 and the pawl 168 are returned to their initial position, the pawl 168 riding over the teeth of the ratchet wheel 166 the latter being arrested by the pawl 184.

The said ratchet movements, by which the spindle 153 performs a part rotation equal to γ are repeated until the stop 173 abuts on the stop 174 and until the contact 172 presses on the button 189 of the switch 175 (Figs. 6, 7, 7a).

The switch 175 is interposed between the switch 105 and the magnet 67 which controls the working stroke of slide 10. When the knob 189 is free of pressure the tongue 1751 rests on the contact post 1752 and forms a part of the circuit in which the magnet 67 is arranged. When the knob is depressed by the contact 172, (Fig. 1) the tongue 1751 (Figs. 6, 7, 7a) is moved until it is arrested by the contact post 1753. A signal lamp 194 is now in the circuit in which the reversing organs for the slide 10 are arranged. The slide 10 is already moving in its last working stroke when the contact 172 (Fig. 1) is coming to make contact with the knob 189 of the switch 175. The reversing for the "Return stroke" is attained by the elements described in a known manner. At the end of the return stroke the slide 10 remains in its lower end position, all the other controlling elements for the feeding-in motion of the carriage 2 remain at rest in their back or rest position as the circuit through the working magnet 67 controlling the working stroke is interrupted owing to the position of the tongue 1751. By closing the switch 96 while the slide 10 is in its lowermost position, the signal lamp 194 is lit but the magnet 67 is out of action.

In this position of the parts, measurements on the workpiece 12 may be made.

Figure 5:
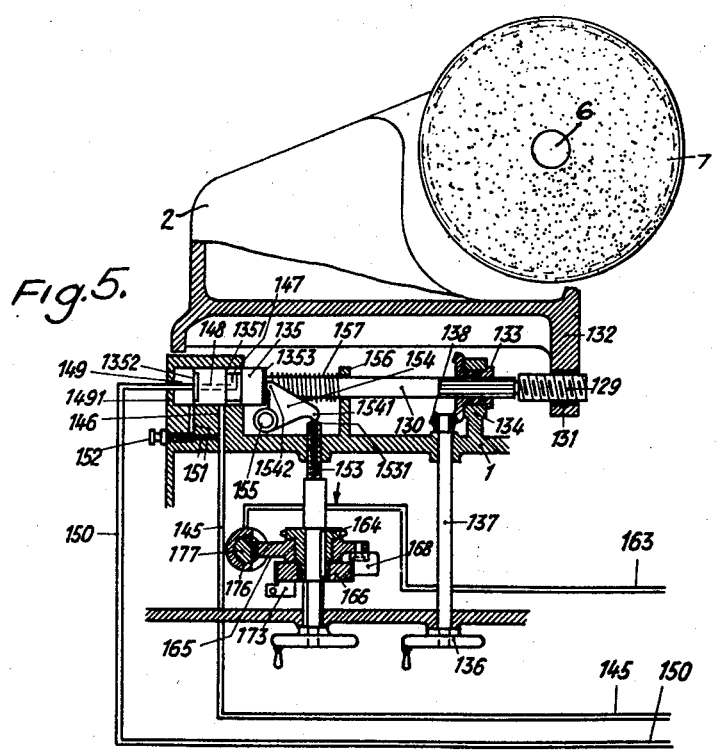
Fig. 5 shows in a diagrammatically sectional view the hydraulically and the manually operable feeding device for the grinding tool carriage.

If the grinding is to be proceeded with, the carriage 2 is fed towards the workpiece 12 by the hand wheel 136 (Figs. 1, 5). By pressing the button 192 the open switch 175 is bridged over and the working stroke magnet 67 is energized. Liquid passed into the cylinder 149 and the grinding disk carriage 2 is fed in. In the cylinder 181 (Fig. 19) there is liquid under pressure but any motion of the piston 177 is impossible as the ledge 173 rests on the stud 174. The automatic infeed device has no effect on this additional working stroke.

The slide 10 performs an upward and a consecutive downward stroke. The switch 175 is not operated during this additional operation and the slide 10 remains at rest at its lowermost position which position is marked by the lighting-up of the lamp 194.

When the grinding work has been finished the lever 142 is set into position "Return" and the lever 73 (Figs. 6, 7, 7a) into the position "Stop." The slide 10 therefore remains at its lowermost position. The grinding disk carriage 2 is moved to its hind end position and the grinding motor 2 and the workpiece motor 20 are stopped by means not shown in the drawings. The workpiece 12 may now be removed from the machine and another one may be brought into position between the two centers 36 and 37. To bring all the controlling elements into their initial positions the lever 183 (Fig. 1) is manually turned in a clockwise direction. The pawl 184 is lifted from the ratchet gear 166. Owing to the falling weight 171 the gear 166 and therewith the spindle 153 is turned by the angle f to their initial positions, in which the face 1731 abuts on stud 170 (Fig. 19). At the beginning of the return movement the knob 189 (Figs. 6, 7, 7a) of the switch 175 is set free. The tongue 1751 is returned automatically to the post 1752 and the circuit through the signal lamp 194 is broken. After all the feeding elements have been returned to their initial position the lever 183 is released, thereby, the pawl 184 is again pressed by the spring 187 in engagement with the ratchet gear 166 and the machine is now ready for another working operation.

To stop the machine, the piston of valve 139 (Figs. 6, 7, 7a) is set by means of the lever 142 to its "Return" position and after that the electric motors 3, 20 for performing the grinding work and for the workpiece carriage 6 respectively, are switched-off by pressing the button 193.

When switching off the motors 3, 20 while the piston of valve 139 is still in the "Stop" or "Forward" position by pressing button 193, the workpiece 12 might be damaged as the two motors would not stop simultaneously. To prevent a wrong manipulation of the stopping means by the operator, the following device is provided.

On a support 198 (Figs. 1, 6, 7, 7a) fastened to the base 1, an electromagnet 190 is arranged. As long as the push button 193 rests on the posts 196, 197 the magnet 190 is energized and attracts the double armed lever 191 pivoted on said support 198. The right end 1394 of the piston of the valve 139 touches the arm 1911 while the valve 139 is in its "Forward" position. When the switch controlled by the push button 193 is opened to stop the motors 3, 20 the circuit through magnet 190 is broken. A spring 195 arranged between the support 198 and the arm 1911 of lever 191 turns the latter in anti-clock direction. The piston of valve 139 is moved by the lever 191 into its "Return" position and the carriage 2 moves to its outer end position.

The described means will also be effective if by any means the current in the net 570, 580 fails and the force of the magnet 190 decreases. The workpiece 12 therefore will never be in contact with the grinding disk 7 when the motors 3, 20 are slowing down to stop. The return movement of the carriage 2 is effected by mechanical means only.

As many changes could be made in the above construction and many apparently widely different embodiments of the invention could be made without departing from the scope thereof, it is intended that all matter contained in the above description, or shown in the accompanying drawings, shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a gear grinding machine of the character described, a base, a slide provided with means thereon for rotatably supporting a toothed workpiece for a grinding operation, said means including a driven shaft carried by said slide in axial alinement with the workpiece when mounted on said slide and adapted to rotate said workpiece, a drum rotatably adjustably mounted on said base about a horizontal axis, a guide way on one end face of said drum in which said slide is mounted for reciprocative movement, a first synchronous motor secured to said drum and having its armature shaft arranged at right angles with respect to the axis of rotation of said drum, a train of spur gears between said armature shaft and said driven shaft carried by the slide, the axes of all of the spur gears in said train of gears being parallel to each other, a grinding wheel, a horizontal guideway on said base, a slide on which said grinding wheel is mounted movable in said horizontal guideway toward and away from the end face of said drum on which said workpiece supporting slide is mounted, a second synchronous motor on said grinding wheel slide for operating the grinding wheel, and hydraulically operable means for adjusting the relative position of the grinding wheel slide with respect to the workpiece slide and for causing the workpiece slide to move in its guide way on said drum.

2. In a gear grinding machine of the character described, a base, a slide provided with means thereon for rotatably supporting a toothed workpiece for a grinding operation, said means including a driven shaft carried by said slide in axial alinement with the workpiece when mounted on said slide, and adapted to rotate said workpiece, a drum rotatably adjustably mounted on said base about a horizontal axis, a guide way on one end face of said drum in which said slide is mounted for reciprocative movement, a first synchronous motor secured to said drum and having its armature shaft arranged at right angles with respect to the axis of rotation of said drum, a train of spur gears between said armature shaft and said driven shaft carried by the slide, the axes of all of the spur gears in said train of gears being parallel to each other, said train of spur gears including a differential gearing, a casing for said differential gearing and forming a part thereof, said casing being mounted in said drum and rotatable about the axis of the armature shaft of said first synchronous motor, said differential gearing reducing the speed of said armature shaft, gear means operated by the workpiece slide when the same is moved in its guide way and operatively connected with said casing for rotating the same when grinding a workpiece having screw teeth, a grinding wheel, a horizontal guide way on said base, a slide on which said grinding wheel is mounted movable in said horizontal guide way toward and away from the end face of said drum on which said workpiece supporting slide is mounted, a second synchronous motor on said grinding wheel slide for operating the grinding wheel, and hydraulically operable means for adjusting the relative position of the grinding wheel slide with respect to the workpiece slide and for causing the workpiece slide to move in its guide way on said drum.

3. In a gear grinding machine of the character described, a base, a slide provided with means thereon for rotatably supporting a toothed workpiece for a grinding operation, said means including a driven shaft carried by said slide in axial alinement with the workpiece when mounted on said slide, and adapted to rotate said workpiece, a drum rotatably adjustably mounted on said base about a horizontal axis, a guide way on one end face of said drum in which said slide is mounted for reciprocative movement, a first synchronous motor secured to said drum and having its armature shaft arranged at right angles with respect to the axis of rotation of said drum, a train of spur gears between said armature shaft and said driven shaft carried by the slide, the axes of all of the spur gears in said train of gears being parallel to each other, said train of spur gears including a differential gearing, and a set of change speed gears arranged between said differential gearing and said driven shaft carried by the slide, a casing for said differential gearing and forming a part thereof, said casing being mounted in said drum and rotatable about the axis of the armature shaft of said first synchronous motor, said differential gearing reducing the speed of said armature shaft, gear means operated by the workpiece slide when the same is moved in its guide way and operatively connected with said casing for rotating the same when grinding a workpiece having screw teeth, a grinding wheel, a horizontal guide way on said base, a slide on which said grinding wheel is mounted movable in said horizontal guide way toward and away from the end face of said drum on which said workpiece supporting slide is mounted, a second synchronous motor on said grinding wheel slide for operating the grinding wheel, and hydraulically operable means for adjusting the relative position of the grinding wheel slide with respect to the workpiece slide and for causing the workpiece slide to move in its guide way on said drum.

4. In a gear grinding machine as claimed in claim 3, including in said hydraulically operable means a hydraulic cylinder mounted on said workpiece slide, a pump for supplying pressure liquid to said hydraulic cylinder to cause said workpiece slide to move in its guide way on the drum, a gear drive operatively connected with a gear of said train of gears and with said pump for driving the latter, said gear being arranged between said set of change speed gears and said driven shaft carried by the workpiece slide.

5. In a gear grinding machine as claimed in claim 2, a hydraulic motor drivingly connected with the rotatable casing of said differential gearing, the connection of said hydraulic motor with said rotatable casing being such that during the working movement of the workpiece slide and also during the idle return movement of said workpiece slide any play in the differential gear train is eliminated.

6. In a gear grinding machine of the character described, a base, a slide provided with means thereon for rotatably supporting a toothed workpiece for a grinding operation, said means including a driven shaft carried by said slide in axial alinement with the workpiece when mounted on said slide and adapted to rotate said workpiece, a drum rotatably adjustably mounted on said base about a horizontal axis, a guide way on one end face of said drum in which said slide is mounted for reciprocative movement, a first synchronous motor secured to said drum and having its armature shaft arranged at right angles with respect to the axis of rotation of said drum, a train of spur gears between said armature shaft and said driven shaft carried by the slide, the axes of all of the spur gears in said train of gears being parallel to each other, a grinding wheel, a horizontal guide way on said base, a slide on which said grinding wheel is mounted movable in said horizontal guide way toward and away from the end face of said drum on which said workpiece supporting slide is mounted, a second synchronous motor on said grinding wheel slide for operating the grinding wheel, means to reciprocate said grinding wheel slide and for causing the grinding wheel to engage the workpiece on the workpiece slide only during the movement of the latter in one direction, means to withdraw the grinding wheel slide from the workpiece slide a predetermined distance in advance of the beginning of the movement of the latter in the opposite direction and to bring the grinding wheel again into its operative position prior to the start of the workpiece slide in the first named direction which is the working stroke, and means for effecting the return movement of the workpiece slide at a higher speed.

7. In a gear grinding machine as claimed in claim 2, including a set of change speed gears arranged in the gear means operated by the workpiece slide for rotating the casing of said differential gearing, and clamping means adapted to arrest and lock said casing against rotation when grinding a workpiece having straight teeth.

8. In a gear grinding machine as claimed in claim 2, including a set of change speed gears arranged in the gear means operated by the workpiece slide for rotating the casing of said differential gearing, and clamping means adapted to arrest and lock said casing against rotation when grinding a workpiece having straight teeth, means to maintain the clamping pressure at a predermined limit comprising a hydraulic motor adapted to operate under variable pressure, and means to prevent the variable pressure between the teeth of the differential gears produced by the varying ratios of the said set of change speed gears to exceed predetermined limits.

9. In a gear grinding machine of the character described, a base, a slide provided with means thereon for rotatably supporting a toothed workpiece for a grinding operation, said means including a driven shaft carried by said slide in axial alinement with the workpiece when mounted on said slide and adapted to rotate said workpiece, a drum rotatably adjustably mounted on said base about a horizontal axis, a guide way on one end face of said drum in which said slide is mounted for reciprocative movement, a first synchronous motor secured to said drum and having its armature shaft arranged at right angles with respect to the axis of rotation of said drum, a train of spur gears between said armature shaft and said driven shaft carried by the slide, the axes of all of the spur gears in said train of gears being parallel to each other, a grinding wheel, a horizontal guide way on said base, a slide on which said grinding wheel is mounted movable in said horizontal guide way toward and away from the end face of said drum on which said workpiece supporting slide is mounted, a second synchronous motor on said grinding wheel slide for operating the grinding wheel, a manually operable infeed device for the grinding wheel slide, an automatically operable infeed device for said grinding wheel slide operable for causing the grinding wheel to engage the workpiece on the workpiece slide only during the movement of the latter in one direction and having means for withdrawing the grinding wheel slide from the workpiece slide a predetermined distance in advance of the beginning of the movement of the latter in the opposite direction and means for bringing the grinding wheel again in operative position prior to the start of the workpiece slide in the first named working stroke direction, and hydraulic controlling means for effecting the return movement of the grinding wheel slide during the idle return movement of the workpiece slide independent of said manually operable infeed device and of said automatic infeed device.

10. In a gear grinding machine as claimed in claim 1, including in said hydraulically operable means a valve, a hydraulic cylinder on said workpiece slide and controlled by said valve, electromagnets adapted to operate said valve, a reversing switch in circuit with said electro-magnets, means on said workpiece slide for actuating said reversing switch when the workpiece slide reaches the ends of its respective strokes for energizing said electro-magnets one at a timet thereby causing an adjustment of said valve to reverse the flow of pressure fluid in said hydraulic cylinder, and a manually operable switch for energizing said electro-magnets independently of said workpiece slide.

11. In a gear grinding machine as claimed in claim 1, means to reciprocate said grinding wheel slide and for causing the grinding wheel to engage the workpiece on the workpiece slide only during the movement of the latter in one direction, means to withdraw the grinding wheel slide from the workpiece slide a predetermined distance in advance of the beginning of the movement of the latter in the opposite direction and to bring the grinding wheel again into its operative position prior to the start of the workpiece slide in the first named direction which is the working stroke, and an automatic damping device operatively connected with said hydraulically operable means for reducing the speed of the infeed movement of the grinding wheel slide shortly before the grinding wheel engages the workpiece.

12. In a gear grinding machine of the character described, a base, a slide provided with means thereon for rotatably supporting a toothed workpiece for a grinding operation, said means including a driven shaft carried by said slide in axial alinement with the workpiece when mounted on said slide and adapted to rotate said workpiece, a drum rotatably adjustably mounted on said base, a guide way on one end face of said drum in which said slide is mounted for reciprocative movement, a first synchronous motor secured to said drum and having its armature shaft arranged at right angles with respect to the axis of rotation of said drum, a train of spur gears between said armature shaft and said driven shaft carried by the slide, the axes of all of the spur gears in said train of gears being parallel to each other, a grinding wheel, a guideway on said base, a slide on which said grinding wheel is mounted movable in said guideway toward and away from the end face of said drum on which said workpiece supporting slide is mounted, a second synchronous motor on said grinding wheel slide for operating the grinding wheel, and hydraulically operable means for adjusting the relative position of the grinding wheel slide with respect to the workpiece slide and for causing the workpiece slide to move in its guide way on said drum.

ALFRED RICKENMANN.

REFERENCES CITED

The following references are of record in the file of this patent:

UNITED STATES PATENTS

| Number | Name | Date |
|---|---|---|
| 1,773,677 | Herrman | Aug. 19, 1930 |
| 2,307,238 | Ross | Jan. 5, 1943 |
| 1,642,554 | Olson | Sept. 13, 1927 |
| 1,773,386 | Burgess | Aug. 19, 1930 |

FOREIGN PATENTS

| Number | Country | Date |
|---|---|---|
| 690,933 | France | Sept. 27, 1930 |
| 508,744 | Great Britain | July 5, 1939 |